United States Patent [19]
Humpert et al.

[11] 3,911,946
[45] Oct. 14, 1975

[54] MIXING FAUCET

[75] Inventors: Jürgen Humpert, Winterhof; Friedrich Wilhelm Bielecke, Hunschlade, both of Germany

[73] Assignee: Friedrich Grohe Armaturenfabrik, Hemer, Germany

[22] Filed: Mar. 14, 1974

[21] Appl. No.: 451,050

[52] U.S. Cl. ............... 137/359; 137/597; 137/606
[51] Int. Cl.² ......................................... F16K 19/00
[58] Field of Search ......... 137/359, 597, 606; 4/192

[56] References Cited
UNITED STATES PATENTS

| | | | |
|---|---|---|---|
| 2,234,226 | 3/1941 | Bloch | 137/597 |
| 2,278,789 | 4/1942 | Kuhnle | 137/597 |
| 2,355,736 | 8/1944 | Klein | 137/606 X |
| 2,659,389 | 11/1953 | Harvey | 137/359 X |
| 2,740,130 | 4/1956 | Stone | 4/192 |
| 3,229,710 | 1/1966 | Keller | 137/359 X |
| 3,387,309 | 6/1968 | Johnson | 137/606 X |
| 3,427,049 | 2/1969 | Politz | 4/192 X |

FOREIGN PATENTS OR APPLICATIONS 227,841   9/1958   Australia................................ 137/606

*Primary Examiner*—Robert G. Nilson
*Attorney, Agent, or Firm*—Thomas L. Peterson

[57] ABSTRACT

A mixing faucet in which the water-conducting components thereof are made separate and completely assembled from the rear into a faucet casing, using O-ring seals and telescoping connections. The casing has a telescoping rear cover that may also act as an installation template, being provided with properly fitted bores for receiving the water connection pieces.

5 Claims, 3 Drawing Figures

MIXING FAUCET

BACKGROUND OF THE INVENTION

This invention relates generally to a mixing faucet and, more particularly, to a mixing faucet adapted to be assembled to conventional plug-type wall connections for use in sanitary facilities.

Typical mixing faucets of the type to which the present invention pertains normally incorporate a number of screw connections which add to manufacturing costs and assembly time. It is the object of the present invention to provide a faucet which dispenses with expensive screw connections, chiefly using plug or telescoping connections, and which is easily assembled.

SUMMARY OF THE INVENTION

According to the principal aspect of the present invention, there is provided a mixing faucet having a casing formed with an enlarged open rear section through which there is mounted a central mixing chamber casing, which is separate from the faucet casing. The mixing chamber casing includes a pair of water inlets and a water outlet. Valve assemblies are telescopically mounted on the water inlets. The valve assemblies are also formed with hollow sections which telescopically engage water connection pieces. The invention thus eliminates screw connections. Other aspects and advantages of the invention will become more apparent from the following description taken in connection with the accompanying drawings.

DESCRIPTION OF THE PREFERRED EMBODIMENT

Figure 1:
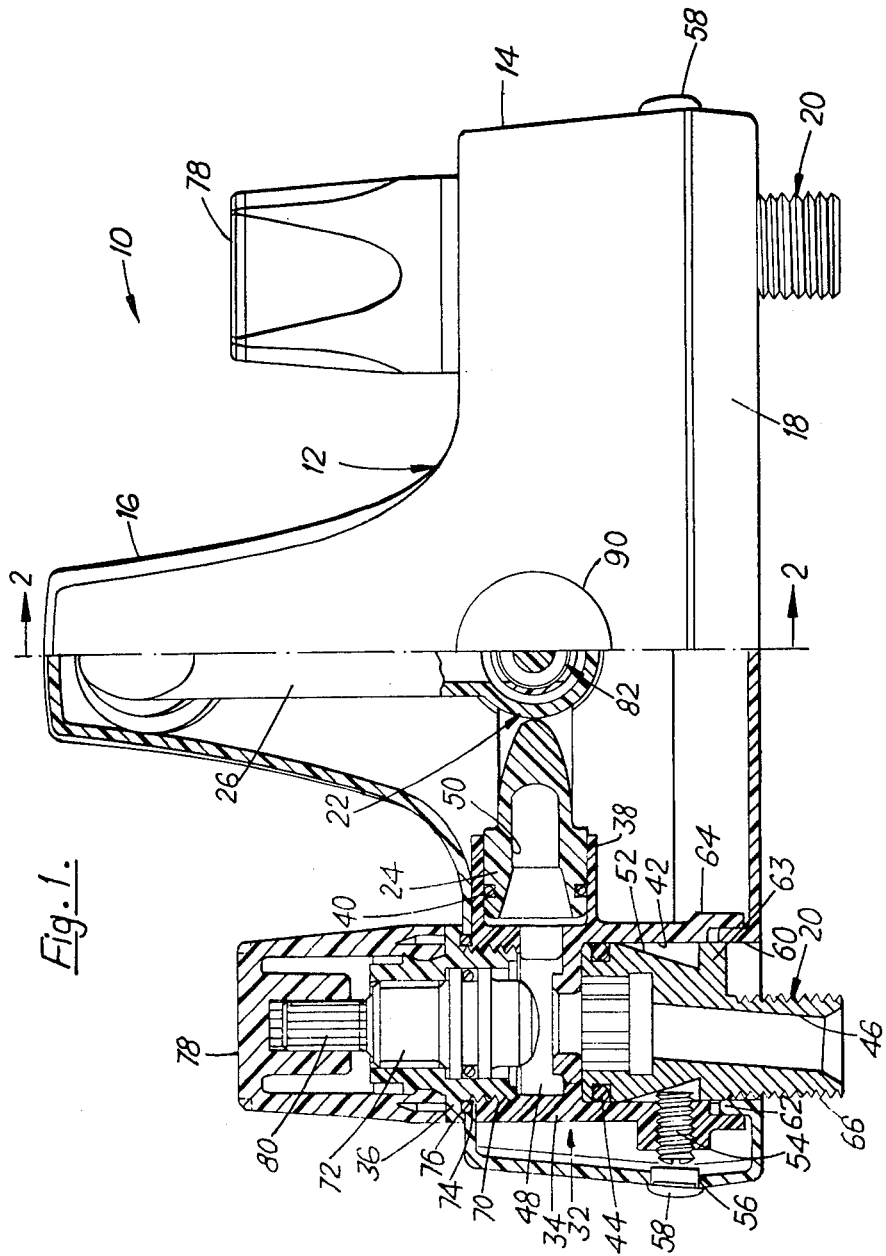
FIG. 1 is a horizontal partial sectional view through a faucet incorporating the novel features of the present invention.
Figure 2:
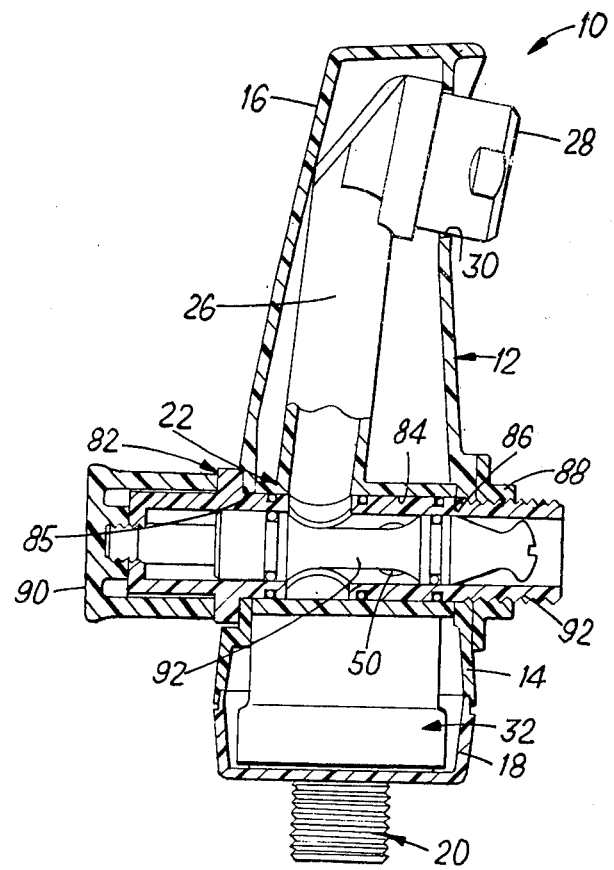
FIG. 2 is a vertical sectional view taken along line 2—2 of FIG. 1.
Figure 3:
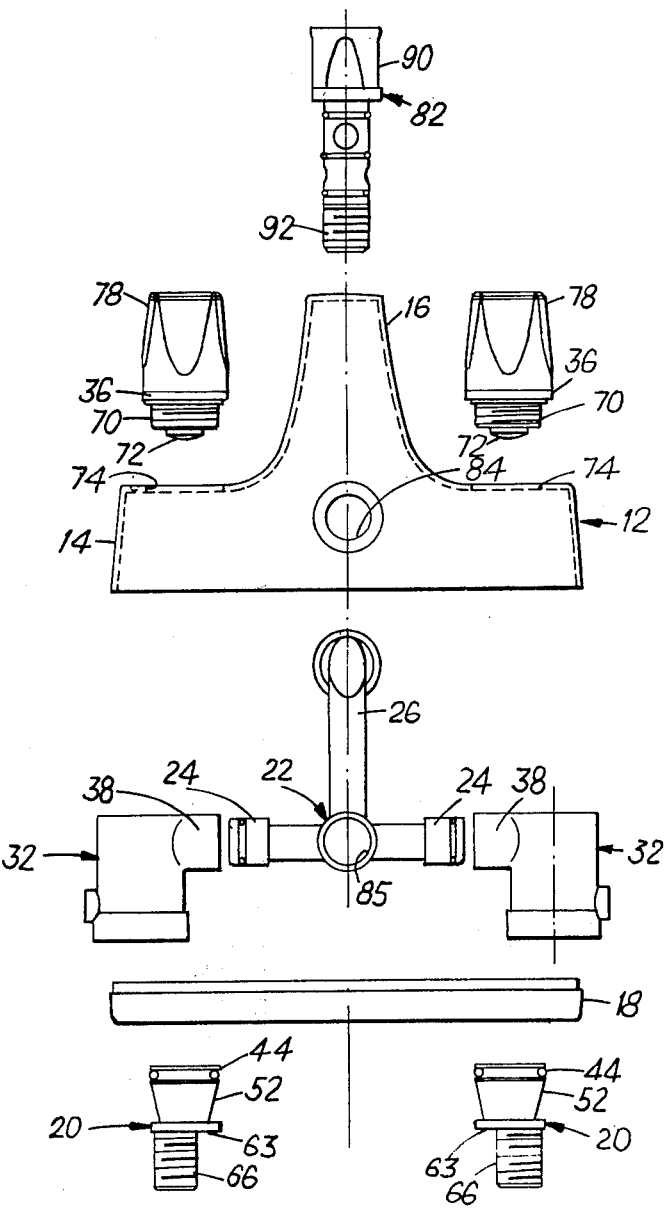
FIG. 3 is an exploded view of the components of the faucet prior to assembly.

Referring now to the drawings in detail, the faucet of the present invention, generally designated 10, comprises a casing 12 having an enlarged rear section 14, which is open in the rearward direction, and a forwardly extending spout 16. A rear cover 18 has a friction or plug connection with the rear of the enlarged section 14 of the casing for closing the same, as best seen in FIG. 2. The casing is assembled to a pair of S connection pieces 20 screwed into water supply pipes (not shown).

A central mixing chamber casing 22 is mounted within the casing 12. The mixing chamber casing 22 is slidably mounted into the faucet casing 12 through the open rear section 14 thereof. The mixing chamber casing has a generally T-shaped configuration, providing coaxial water inlets 24 and a tub outlet 26 which is perpendicular to the axis of the inlets. The outlet 26 extends lengthwise in the spout 16 of the faucet casing. An aerator 28 is mounted on the end of the tub outlet 26, and extends through the bottom of the spout through an opening 30, as seen in FIG. 2.

A valve assembly, generally designated 32, is mounted on each water inlet 24. Each valve assembly includes an inner valve component 34 and an outer valve component 36. The inner valve component is formed with a cylindrical bushing 38 which is telescopically mounted on the water inlet 24. An O-ring 40 provides a seal between the bushing and the water inlet. The inner valve component is also formed with a downwardly facing cylindrical recess 42 which fits over the upper end of an S connection piece 20. An O-ring 44 provides a seal between the S connection piece and the wall of the recess 42. The connection piece 20 is provided with a passage 46 which communicates with the chamber 48 inside the inner valve component. This chamber in turn communicates with the passage 50 in the water inlet 24.

It is noted that the upper section of each connection piece 20 is formed with an inverted frustoconical surface 52. A set screw 54 mounted in the side of each valve component 34 engages the frustoconical surface 52 to retain the valve components, and hence the faucet casing, mounted securely to the S connection piece. An opening 56 is provided in the side wall of the casing 12 in alignment with each set screw 54 to permit the insertion of a tool for tightening or loosening the set screw. A plug 58 closes each openning 56.

A bore 60 is formed in the cover 18 of the faucet casing coaxial with the axis of each recess 42 in the valve component 34. An annular shoulder is formed on the cover 18 surrounding each bore 60. The shoulder extends inwardly in nesting relationship with a centering collar 63 on the connection piece 20 and with the lower cylindrical end 64 of the inner valve component.

It is noted that the lower end 66 of each S connection piece 20 is eccentric with respect to the centering collar 63, and the latter is coaxial with the axis of the inner valve component 34, for a purpose which will appear later.

The lower end 70 of each outer valve component 36 is threadably engaged to the upper end of the inner valve component 34. The outer valve component carries a conventional valve element 72 which is coaxial with the recess 42 in the inner valve component and also with the bore 60 in the cover 18. The outer valve component extends outwardly from the casing 12 through an opening 74 coaxial with the bore 60. An O-ring 76 may be positioned between the wall of the opening 74 and the outer valve component. Handle 78 is mounted on the stem 80 of each valve element 72 in the conventional manner.

Thus, it is seen that each valve assembly 32 has a plug or telescoping connection to its corresponding water inlet 24 and S connection piece 20, thereby eliminating the necessity of screw threaded connections as is typical in conventional faucets.

Referring now to FIG. 2, an integral flow reversing device, generally designated 82, is mounted in the central mixing chamber casing 22 through an opening 84 therein which extends perpendicular to the tub outlet 26 and to the common axis of the water inlets 24. The reversing device also extends through holes 85, 86 in the top and bottom walls, respectively, of the faucet casing. The reversing device is retained in the casing by means of a nut 88. The reversing device is generally conventional in structure and the details will not be described herein. It will simply be appreciated that upon lifting the handle 90 on the upper end of the reversing device the valve element 92 will be shifted to allow flow from the water inlet passage 50 to a hand shower connection 92.

The process of assemblying the components to form a complete faucet is as follows. The inner valve components 34 are slipped with their bushings 38 onto the water inlets 24 of the central mixing chamber casing 22. Next, the unit thus formed is slidably inserted from the rear into the casing 12. Then the outer valve components 36 are screwed through the openings 74 into the inner valve components 34. Next the integral reversing device 82 is slipped through the openings 84, 85 and 86 and tightened by the nut 88 on the underside of the casing. After the rear cover 18 has been plugged into the enlarged open rear section 14 of the casing 12, factory assembly is completed.

Wall mounting of the faucet 10 is effected in the following manner. The rear cover 18 is pulled off of the casing 12 and is placed as a template over the S connection pieces 20. The S connection pieces are rotated so that the shoulders 62 on the rear cover fit over the centering collars 63 formed on the connection pieces 20. With the screws being turned out sufficiently, the faucet is now slipped with its valve components 32 onto the pre-centered plug connections of the S connection pieces 20. The valve members are secured by tightening the screws 54, the plug connection between the faucet casing 12 and the rear cover 18 at the same time engaging each other. Next, the openings 56 provided for operating the set screws 54 are closed by forcing the plugs 58 therein. If the handles 78 have not been previously mounted on the valve assembles 32 at the factory, they may now be mounted thereon.

From the foregoing will be seen that the faucet of the present invention can be readily assembled, using telescoping or plug connections, thereby eliminating expensive threaded connections. The faucet may also be easily mounted to a wall over S connections, with the cover 18 functioning as a template to assist in such mounting. Preferably the components of the faucet are formed of plastic, thereby assuring low manufacturing costs.

What is claimed is:

1. A mixing faucet comprising:
a faucet casing having an enlarged open rear section and a forwardly extending spout;
a central mixing chamber casing including a pair of water inlets and a water outlet, said water inlets having generally coaxial terminal open ends, said water outlet being generally perpendicular to the axis of said water inlet terminal ends, said central mixing chamber casing including said water inlet terminal ends and said outlet therof being entirely disposed within said faucet casing;
a valve assembly for each said water inlet, each said valve assembly being slidably telescopically engaged inside said casing with the terminal end of its respective water inlet;
each said valve assembly having a rearwardly opening hollow section adapted to be slidably telescopically engaged with a water connection piece, the axis of the hollow sections of said valve assemblies being parallel to each other and generally perpendicular to said axis of said water inlet terminal ends;
said central mixing chamber casing and said valve assemblies being slidably inserted into said faucet casing through said open rear section thereof, with said water outlet extending into said spout;
an opening in said faucet casing in front of each said valve assembly; and
each said valve assembly extending forwardly through its corresponding opening.

2. A mixing faucet comprising:
a faucet casing having an enlarged open rear section and a forwardly extending spout;
a central mixing chamber casing including a pair of generally coaxial water inlets and a water outlet generally perpendicular to the axis of said inlets;
a valve assembly for each said water inlet, each said valve assembly being telescopically engaged with its respective water inlet;
each said valve assembly having a hollow section adapted to be telescopically engaged with a water connection piece, the axis of the hollow sections of said valve assemblies being parallel to each other and generally perpendicular to said axis of said inlets;
said central mixing chamber casing and said valve assemblies being slidably inserted into said faucet casing through said open rear section thereof, with said water outlet extending into said spout;
an opening in said faucet casing in front of each said valve assembly;
each said valve assembly extending forwardly through its corresponding opening;
a cover detachably mounted to said open rear section of said faucet casing;
bores in said cover coaxial with said openings; and
annular shoulders formed on the inside of said cover surrounding said bores.

3. A mixing faucet as set forth in claim 2 wherein:
said cover is telescopically engaged to said faucet casing.

4. A mixing faucet for mounting to water connection pieces comprising:
a faucet casing having an open rear section;
a central mixing chamber casing including a pair of water inlets and a water outlet, said water inlets having generally coaxial terminal open ends, said central mixing chamber casing including said water inlet terminal ends and said outlet thereof being mounted entirely within said faucet casing;
a valve assembly mounted on each of said water inlet terminal ends, each said valve assembly being slidably telescopically engaged inside said casing with its respective water connection piece; and
said central mixing chamber casing and said valve assemblies being slidably inserted into said faucet casing through said open rear section thereof.

5. A mixing faucet as set forth in claim 4 wherein:
said faucet casing has a front wall with a spout extending forwardly therefrom;
said water outlet extending into said spout; and
each said valve assembly engaging said front wall.

* * * * *

UNITED STATES PATENT OFFICE
CERTIFICATE OF CORRECTION

PATENT NO. : 3,911,946
DATED : October 14, 1975
INVENTOR(S) : Jurgen (nmn) Humpert, Dr. Friedrich Wilhelm Bielecke It is certified that error appears in the above-identified patent and that said Letters Patent are hereby corrected as shown below:

On the first page containing the ABSTRACT, first column, after "[21] Appl. No.: 451,050," insert:

[30] Foreign Application Priority Data:

March 24, 1973    Germany......P 231,4853.0

*Signed and Sealed this*

*second* Day of *March 1976*

[SEAL]

Attest:

RUTH C. MASON
*Attesting Officer*

C. MARSHALL DANN
*Commissioner of Patents and Trademarks*